Patented May 18, 1948

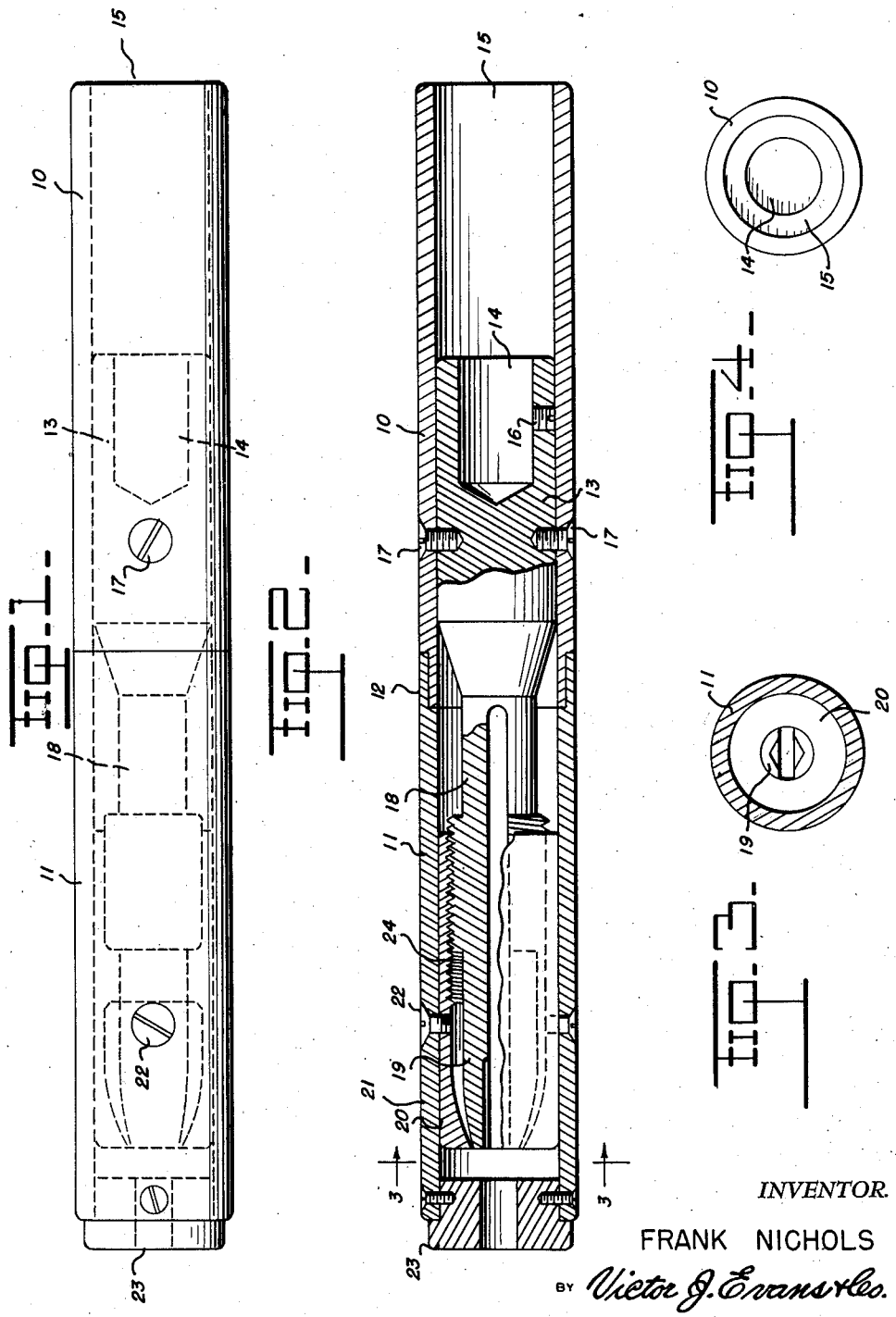

2,441,589

UNITED STATES PATENT OFFICE 2,441,589

WELDING ROD HOLDER

Frank Nichols, Pensacola, Fla.

Application October 30, 1945, Serial No. 625,619

1 Claim. (Cl. 219—8)

The invention relates to holding device, and more especially, to a welding electrode holder.

The primary object of the invention is the provision of a device of this character, wherein an electrode for welding can be conveniently and efficiently held in the burning thereof, the device being of novel construction and unique in the arrangement of parts, these being few in number, thus economical for repairs and replacements, and the electrode is chuck clamped therein.

Another object of the invention is the provision of a device of this character, wherein it is safe against injury to a user, and heat resisting, it being readily and easily handled, and is susceptible of the application and removal of an electrode with ease and dispatch.

A further object of the invention is the provision of a device of this character, which is simple in construction, thoroughly reliable and efficient in operation, strong, durable, compact, light in weight without sacrificing strength and durability, readily and easily adjusted for the application and removal of the electrode, and inexpensive to manufacture.

With these and other objects in view, the invention consists in the features of construction, combination and arrangement of parts as will be hereinafter more fully described, illustrated in the accompanying drawing, which shows the preferred embodiment of the invention, and pointed out in the claim hereunto appended.

In the accompanying drawing:

Figure 1 is a side elevation of the holder or device constructed in accordance with the invention, and devoid of an electrode.

Figure 2 is a vertical longitudinal sectional view thereof.

Figure 3 is a sectional view taken on the line 3—3 of Figure 1 looking in the direction of the arrows.

Figure 4 is an end view.

Similar reference characters indicate corresponding parts throughout the several views in the drawing.

Referring to the drawing in detail, the holder or device constituting the present invention comprises a two-part outer tubular shell or cylindrical housing, made from suitable insulating material, its part 10 being the inner or heel portion, and the part 11 is the outer or chuck encasing portion of the shell or housing. These parts 10 and 11 are interfitted at their meeting ends, as at 12, so that the portion 11 can be rotated relative to the portion 10, best seen in Figure 2 of the drawing.

Within the portion 10 to be wholly inside of the shell or housing, is an electric current conducting member 13, which has a socket 14 opening in the direction of the open end 15 of the portion 10 for the attachment of a lead-in wire, not shown, and the latter is detachably secured in place by a set screw 16, while the member is held fast by retaining screws 17, within the portion 10, as best seen in Figure 2 of the drawing.

The member 13 is formed with a chuck extension 18, having springy gripping jaws 19, acted upon by a wedging sleeve 20 encircling the chuck extension, and fixed interiorly of the portion 11 inset from the outer end 21 thereof by fasteners 22. Thus it should be seen that when the portion 11 is turned the sleeve turns therewith for the clamping action or release of the jaws 19 for unclamping action, respectively.

The outer end 21 of the portion 11 has seated therein an open center fiber plug 23, and through this center is passed the electrode, not shown, for the clamping thereof in the chuck extension 18 to be clamped by its jaws 19 through turning action of the sleeve 20, which is controlled by the portion 11 by manual turning operation. The meeting ends 12 are interfitted to allow axial displacement of the portion 11 with respect to the portion 10, so that the chuck extension 18 can be operated for clamping and unclamping activity. The portion 10 can function as the handle area of the holder or device.

The sleeve 20 is inter-threaded at 24 with the chuck extension 18 for the wedging operation of such sleeve in the operation of the holder or device.

What is claimed is:

A welding electrode holder comprising a two-part cylindrical housing formed of insulating material and interfitted together at their ends so that one part can be rotated relative to the other, a current-conducting member connected to one part and having a connecting portion for the attachment to the conductor of a lead-in wire, said conducting member having a chuck extension with springy gripping jaws extending into the other part, a wedging sleeve in the other part encircling the chuck extension and fixed to the interior of the second part so that as the second part is turned upon the first part clamping action or release of the jaws can be effected, and a formation on the outer end of the second part through which the welding rod can be extended for engagement with the chuck extension, said chuck extension and said wedging sleeve being threadedly connected together for axial adjustment relative to one another.

FRANK NICHOLS.

REFERENCES CITED

The following references are of record in the file of this patent:

UNITED STATES PATENTS

| Number | Name | Date |
| --- | --- | --- |
| 2,350,426 | Thompson | June 6, 1944 |
| 2,357,844 | Nellis | Sept. 12, 1944 |